US009052822B2

(12) United States Patent
Saijo et al.

(10) Patent No.: US 9,052,822 B2
(45) Date of Patent: Jun. 9, 2015

(54) PORTABLE ELECTRONIC DEVICE, AND CONTROL METHOD AND CONTROL PROGRAM FOR THE SAME

(75) Inventors: Koji Saijo, Kanagawa (JP); Akira Aoshima, Kanagawa (JP)

(73) Assignee: KYOCERA CORPORATION, Kyoto (JP)

( * ) Notice: Subject to any disclaimer, the term of this patent is extended or adjusted under 35 U.S.C. 154(b) by 653 days.

(21) Appl. No.: 13/297,383

(22) Filed: Nov. 16, 2011

(65) Prior Publication Data

US 2012/0119878 A1 May 17, 2012

(30) Foreign Application Priority Data

Nov. 16, 2010 (JP) .................................. 2010-255979

(51) Int. Cl.
*G05B 19/00* (2006.01)
*G06F 3/0489* (2013.01)
(52) U.S. Cl.
CPC .................................. *G06F 3/0489* (2013.01)
(58) Field of Classification Search
None
See application file for complete search history.

(56) References Cited

U.S. PATENT DOCUMENTS

| 6,381,474 | B1 * | 4/2002 | Kraft ............................. 455/566 |
| 7,412,223 | B1 * | 8/2008 | Yamamoto et al. ........... 455/403 |
| 8,050,654 | B2 * | 11/2011 | Fukaya et al. ................. 455/410 |
| 8,902,166 | B2 | 12/2014 | Takeuchi |
| 2003/0030542 | A1 * | 2/2003 | von Hoffmann ............. 340/5.61 |
| 2005/0233769 | A1 * | 10/2005 | Tanaka et al. ................. 455/557 |
| 2009/0058816 | A1 | 3/2009 | Takeuchi |
| 2009/0311991 | A1 * | 12/2009 | Shin .............................. 455/411 |
| 2010/0024020 | A1 * | 1/2010 | Baugher et al. .................... 726/7 |

FOREIGN PATENT DOCUMENTS

| JP | 11-4291 A | 1/1999 |
| JP | 2007-200243 A | 8/2007 |
| JP | 2007334637 A | 12/2007 |
| JP | 200959264 A | 3/2009 |

OTHER PUBLICATIONS

Notice for Reasons for Rejection to corresponding Japanese Application No. 2010-255979, pp. 1-2 (May 13, 2014).
Decision of Refusal Issued to corresponding Japanese Application No. 2010-255979, p. 1 (Dec. 16, 2014).

* cited by examiner

*Primary Examiner* — Curtis King
(74) *Attorney, Agent, or Firm* — Hoffmann & Baron, LLP

(57) ABSTRACT

An object of the present invention is to provide a portable electronic device of which operability is improved while maintaining a security function, and to provide a control method and a control program for the portable electronic device. In a case in which a function setting operation key is operated, a function limiting unit displays a screen for requesting password (for example, a personal identification number, a password, etc.) on a display unit, and limits utilization of a function assigned to the function setting operation key (for example, a variety of setting, an address book function, an electronic mail function, etc.).

14 Claims, 8 Drawing Sheets

| KEY POSITION INFORMATION | KEY ASSIGNMENT |
|---|---|
| ⋮ | ⋮ |
| X2, Y1 | 1 |
| X2, Y2 | 2 |
| X2, Y3 | 3 |
| X3, Y1 | 4 |
| X3, Y2 | 5 |
| X3, Y3 | 6 |
| ⋮ | ⋮ |

| KEY POSITION INFORMATION | NUMBER OF CONSECUTIVE DEPRESSION | KEY ASSIGNMENT |
|---|---|---|
| ⋮ | | ⋮ |
| X2, Y1 | 1 | A |
| | 2 | I |
| | 3 | U |
| | 4 | E |
| | 5 | O |
| | | ⋮ |

| KEY POSITION INFORMATION | KEY ASSIGNMENT |
|---|---|
| ⋮ | ⋮ |
| X2, Y1 | 1ch |
| X2, Y2 | 2ch |
| X2, Y3 | 3ch |
| X3, Y1 | 4ch |
| X3, Y2 | 5ch |
| X3, Y3 | 6ch |
| ⋮ | ⋮ |

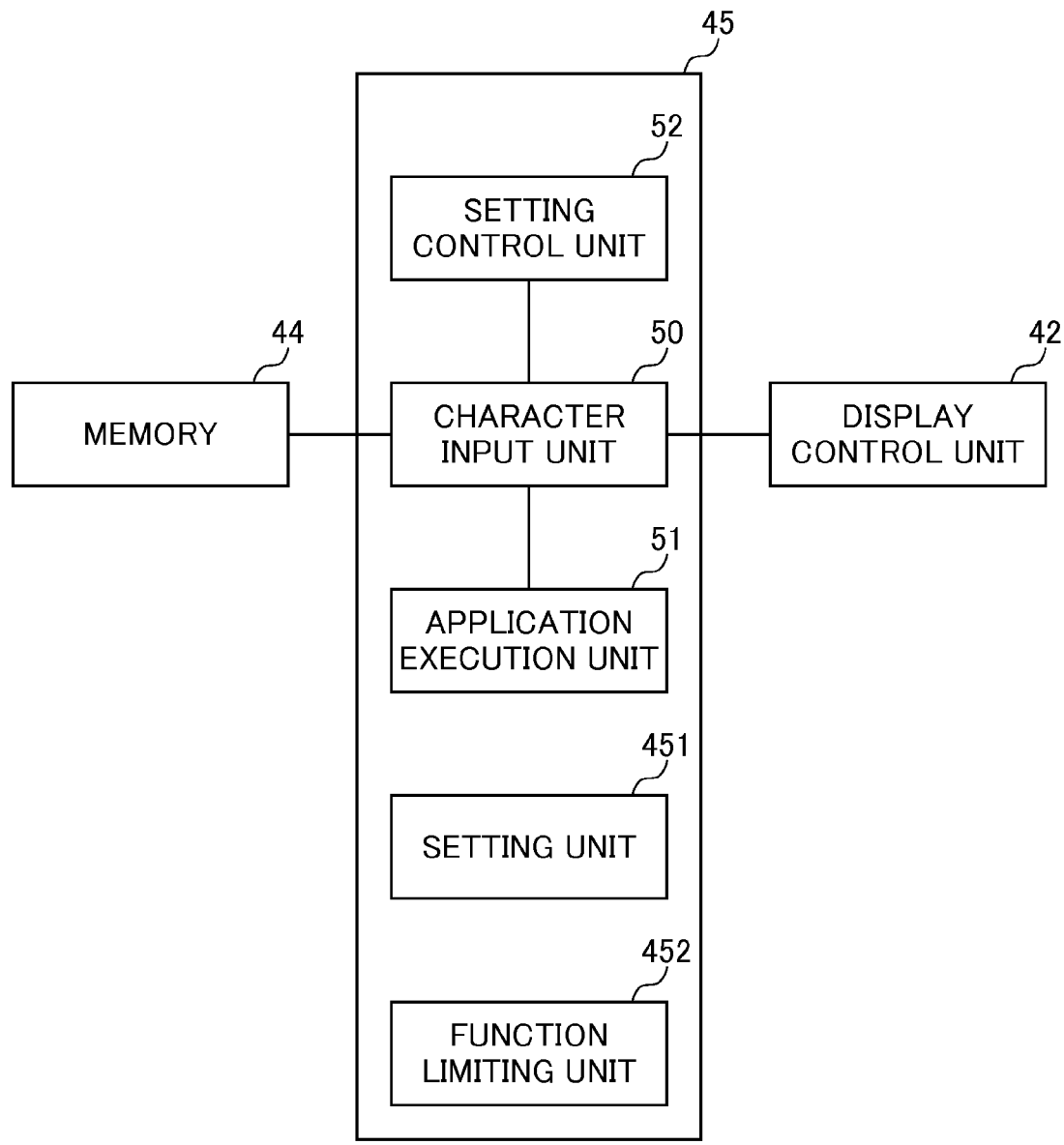

PORTABLE ELECTRONIC DEVICE, AND CONTROL METHOD AND CONTROL PROGRAM FOR THE SAME

This application is based on and claims the benefit of priority from Japanese Patent Application No. 2010-255979 filed on 16 Nov. 2010, the content of which is incorporated herein by reference.

BACKGROUND OF THE INVENTION

1. Field of the Invention

The present invention relates to a portable electronic device, and a control method and a control program for the portable electronic device.

2. Related Art

Conventionally, in an electronic device having a display unit and an operation unit, when the operation unit is operated in a state where a wallpaper screen is displayed on the display unit, by inputting a character assigned to the operation unit, the character is displayed on the display unit. In addition, in such a portable electronic device, when a user selects a desired character input application in a state where a character is input thereinto, the selected character input application is activated in a state where the character is input thereinto (for example, see Japanese Unexamined Patent Application, Publication No. 2007-200243).

On the other hand, conventionally, a portable electronic device has been proposed, which includes a security function that limits a function by operating an operation unit, in which the security function is cancelled by inputting password via the operation unit (for example, see Japanese Unexamined Patent Application, Publication No. H11-004291).

SUMMARY OF THE INVENTION

However, in the portable electronic device with a security function being set, which is disclosed in Japanese Unexamined Patent Application, Publication No. 2007-200243, a user selects a desired character input application in a state where a character is input thereinto, as disclosed in Japanese Unexamined Patent Application, Publication No. H11-004291. In this case, in such a portable electronic device, even if an attempt is made to activate a selected character input application in a state where a character is input thereinto, password is required to be input each time of activation; therefore, the operation has been troublesome.

An object of the present invention is to provide a portable electronic device of which operability is improved while maintaining a security function, and to provide a control method and a control program for the portable electronic device.

In order to solve the aforementioned problem, a portable electronic device according to the present invention includes: a display unit; an operation unit including a plurality of keys to which characters are assigned; and a control unit, in which, in a state where a wallpaper screen is displayed, in accordance with operation of the key, the control unit displays the characters, and displays information on a plurality of functions that can utilize the characters, and in accordance with selection from among the plurality of functions, the control unit distinguishes whether to limit a selected function.

Moreover, in a case of distinguishing that utilization of the selected function is limited, the control unit allows utilization of the selected function only when password is input, in a case of distinguishing that utilization of the selected function is not limited, the control unit allows utilization of the selected function without inputting the password.

In addition, the selected function, of which utilization has been distinguished to be limited, preferably includes at least one of a function to use personal information or a function to perform communication with an external device.

Furthermore, the portable electronic device preferably further includes a storage unit that stores dictionary data in which conversion candidates for predetermined characters are registered in advance, in which the control unit preferably displays conversion candidates for the character being input, by using only the dictionary data stored.

Moreover, when the wallpaper screen is displayed after limitation on utilization of the function is cancelled to allow utilization thereof, the control unit preferably limits utilization of the function again.

In addition, the portable electronic device preferably further includes a setting unit that sets limitation on each of the plurality of functions, in which, in a case in which limitation has been set by the setting unit, based on the selected function, the control unit preferably distinguishes whether to limit the function, and in a case in which limitation has not been set by the setting unit, the control unit preferably allows utilization of the selected function, without limiting the selected function.

In order to solve the aforementioned problem, a portable electronic device according to the present invention includes: a display unit; an operation unit including a first key and second keys, the first key being not assigned with a character and being assigned with a function, the second keys being assigned with characters; and a control unit, in a case in which the first key is operated, the control unit limits utilization of a function assigned to the first key, and in a case in which the second keys are operated, the control unit displays characters assigned to the second keys.

Moreover, in a case in which the first key is operated, the control unit preferably allows utilization of a function assigned to the first key only when password is input; and in a case in which the second keys are operated, the control unit preferably displays characters assigned to the second keys without inputting the password.

In addition, in a state where a wallpaper screen is displayed on the display unit, in a case in which the first key is operated, the control unit preferably allows utilization of a function assigned to the first key, and in a case in which the second keys are operated, the control unit preferably displays characters assigned to the second keys.

Furthermore, after limitation on utilization of the function assigned to the first key is cancelled to allow utilization thereof, when a wallpaper screen is displayed on the display unit, the control unit preferably limits utilization of the function again.

Moreover, the portable electronic device preferably further includes a setting unit that sets limitation on the function, in which, in a case in which limitation has been set by the setting unit, in a case in which the first key is operated, the control unit preferably limits utilization of a function assigned to the first key, and in a case in which the second keys are operated, the control unit preferably displays characters assigned to the second keys, and in a case in which limitation has not been set by the setting unit, in a case in which the first key is operated, the control unit preferably allows utilization of a function assigned to the first key, and in a case in which the second keys are operated, the control unit preferably displays characters assigned to the second keys.

In order to solve the aforementioned problem, a method of controlling a portable electronic device according to the present invention includes the steps of: displaying characters on a display unit in accordance with keys operation which assigned the characters in a state where a wallpaper screen is displayed, and displaying information on a plurality of functions that can utilize the character on the display unit; and distinguishing, in accordance with selection from among the plurality of functions, whether to limit the function.

In order to solve the aforementioned problem, a control program according to the present invention is a control program for operating a computer of a portable electronic device, and the control program includes the steps of: displaying characters on a display unit in accordance with keys operation which assigned the characters in a state where a wallpaper screen is displayed, and displaying information on a plurality of functions that can utilize the character on the display unit; and distinguishing, in accordance with selection from among the plurality of functions, whether to limit the function.

In order to solve the aforementioned problem, a control method according to the present invention is a method of controlling a portable electronic device including an operation unit having a first key and second keys, the first key being not assigned with a character and being assigned with a function, the second keys being assigned with characters, the method comprising the steps of: limiting utilization of a function assigned to the first key in a case in which the first key is operated; and displaying characters assigned to the second keys in a case in which the second keys are operated.

In order to solve the aforementioned problem, a control program according to the present invention is a control program for operating a computer of a portable electronic device including an operation unit having a first key and second keys, the first key being not assigned with a character and being assigned with a function, the second keys being assigned with characters, the control program comprising the steps of: limiting utilization of a function assigned to the first key in a case in which the first key is operated; and displaying characters assigned to the second keys in a case in which the second keys are operated.

According to the present invention, it is possible to provide a portable electronic device of which operability is improved while maintaining a security function, and to provide a control method and a control program for the portable electronic device.

BRIEF DESCRIPTION OF THE DRAWINGS

FIG. 4 is a functional block diagram showing functions of a control unit;

DETAILED DESCRIPTION OF THE INVENTION

Figure 1:
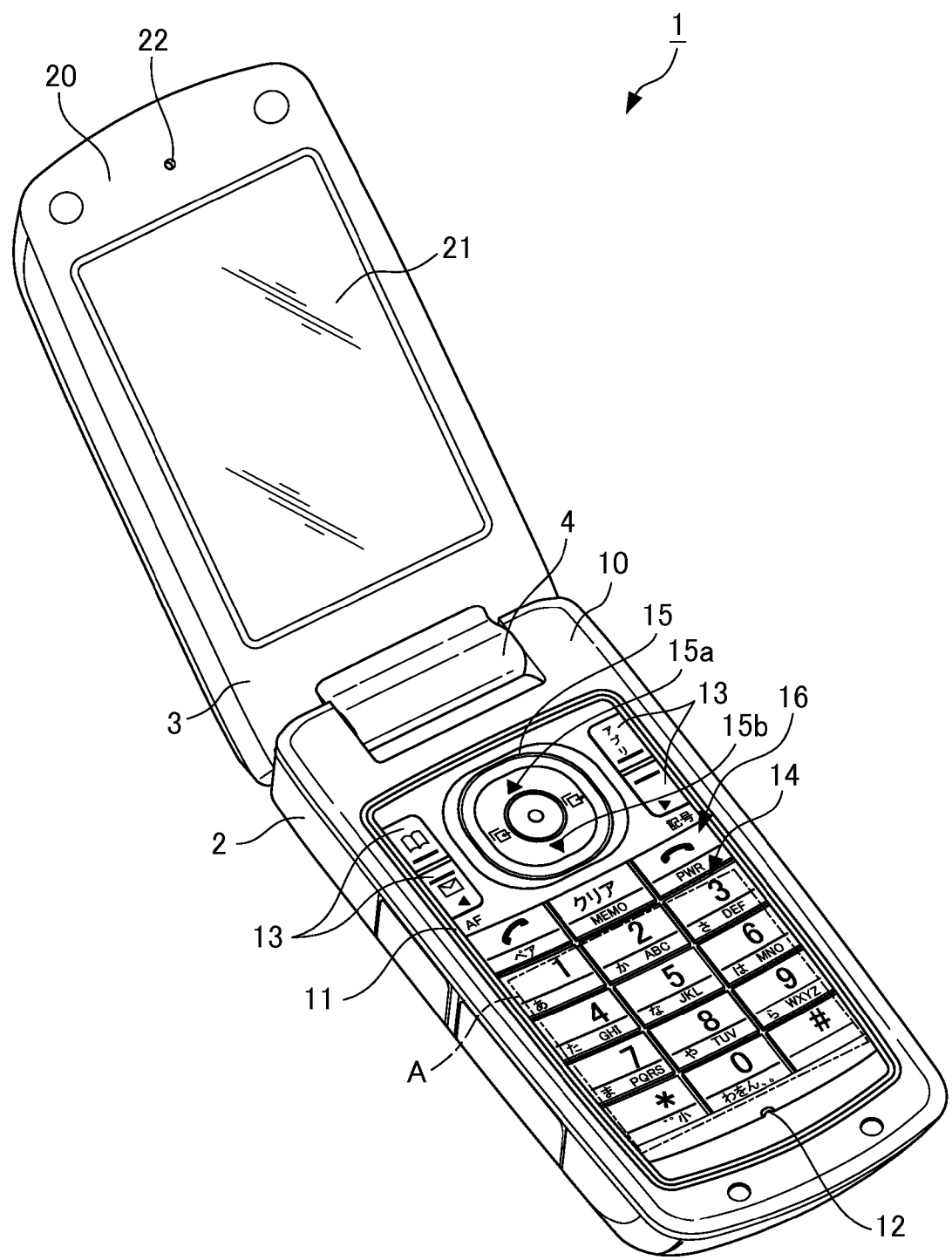
FIG. 1 is a perspective view showing an appearance of a cellular telephone device.

FIG. 1 is a perspective view showing an appearance of a cellular telephone device 1 as an embodiment of a portable electronic device according to the present invention. It should be noted that, although FIG. 1 shows what is called a folding-type cellular telephone device, the cellular telephone device according to the present invention is not particularly limited thereto. For example, the type of the cellular telephone device may be a slider type in which one of the bodies slides to one direction in a state in which the bodies are mutually superimposed; a rotating (turning) type in which one of the bodies is rotated around an axis line along the direction of superimposing the bodies; and a type (straight type or flip type) in which an operation unit and a display unit are disposed in one body without having a connecting portion.

The cellular telephone device 1 includes an operation unit side body 2 and a display unit side body 3. The operation unit side body 2 includes, on a front face portion 10 thereof, an operation unit 11 and a microphone 12 to which sound produced by a user of the cellular telephone device 1 during a phone call is input. The operation unit 11 is configured with: function setting operation keys 13 for operating various functions such as for various settings, a telephone number directory function and a mail function; input operation keys 14 for inputting the digits of a telephone number and characters for mail, and the like; and a selection operation key 15 for executing selection of the various operations, scrolling, and the like. In other words, characters are not assigned but functions are assigned to the function setting operation keys 13; whereas characters and numeric characters (or symbols) are assigned to the input operation keys 14. It should be noted that the function setting operation keys 13, the input operation keys 14 and the selection operation key 15 may be configured to be disposed on a touch panel that is formed integrally with a display unit 21.

Moreover, the display unit side body 3 includes, on a front face portion 20, the display unit 21 for displaying a variety of information, and a receiver 22 for outputting sound of the other party during a telephone call.

In addition, an upper end portion of the operation unit side body 2 and a lower end portion of the display unit side body 3 are connected via a hinge mechanism 4. Furthermore, the cellular telephone device 1 can be in a state where the operation unit side body 2 and the display unit side body 3 are apart from each other (opened state), and in a state where the operation unit side body 2 and the display unit side body 3 are contacting each other (folded state), as the operation unit side body 2 and the display unit side body 3, connected via the hinge mechanism 4, pivot with respect to each other.

Figure 2:
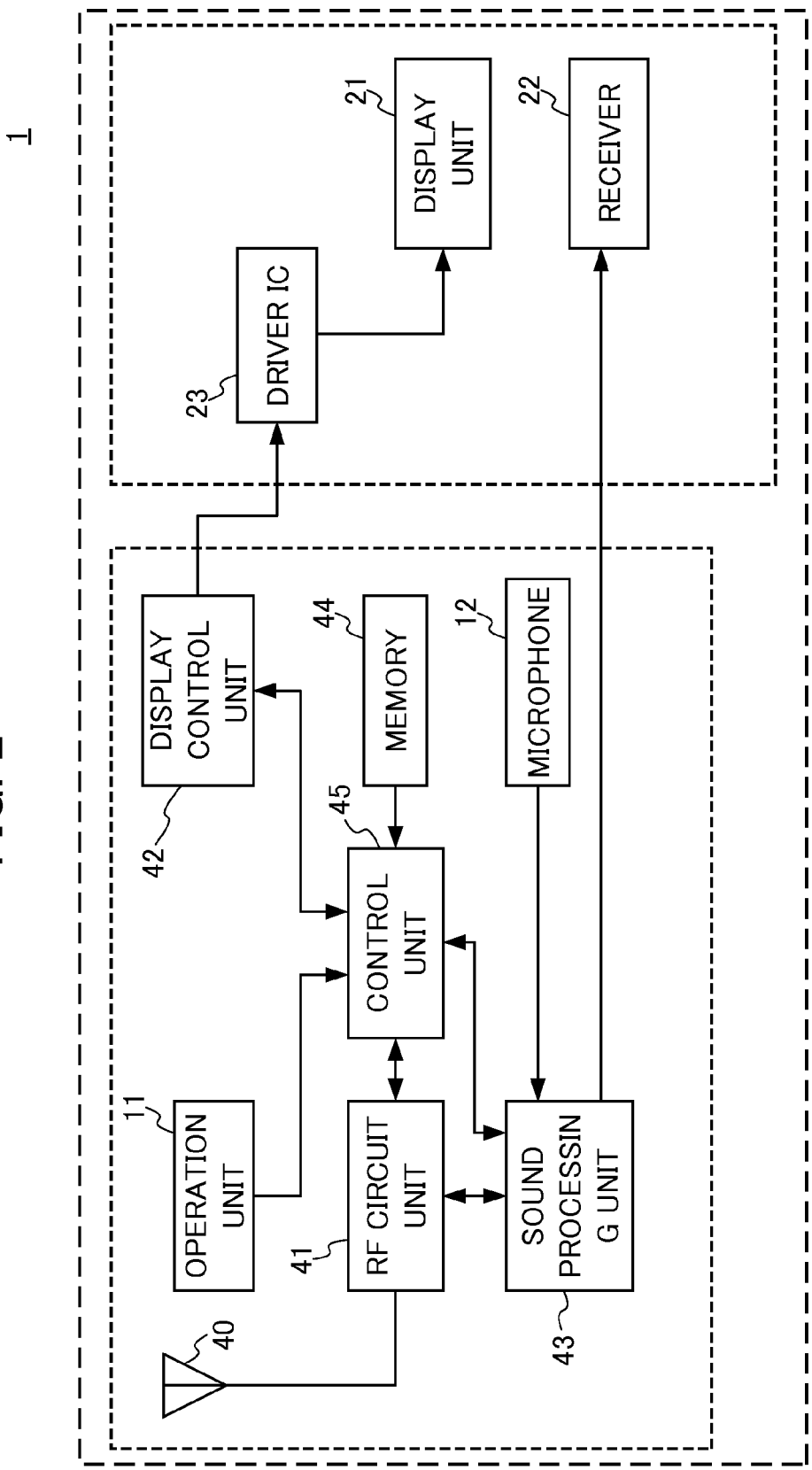
FIG. 2 is a functional block diagram showing functions of the cellular telephone device.

FIG. 2 is a functional block diagram showing functions of the cellular telephone device 1. In the cellular telephone device 1, for example, as shown in FIG. 2, the operation unit side body 2 includes the operation unit 11, the microphone 12, a main antenna 40, an RF circuit unit 41, a display control unit 42, a sound processing unit 43, memory 44, and a control unit 45. In the cellular telephone device 1, the display unit side body 3 includes the display unit 21, the receiver 22, and a driver IC 23.

The main antenna 40 communicates with a base station or the like via a first usable frequency band (for example, 800 MHz), and is configured as a dual band compatible antenna that is also compatible with a second usable frequency band (for example, 1.5 GHz) for GPS communication. It should be noted that, although 800 MHz is set as the first usable frequency band in the present embodiment, other frequency bands can also be used. Moreover, the main antenna 40 may communicate with an external device via the first usable frequency band, and another antenna compatible with the second usable frequency band for GPS communication may be separately provided.

The RF circuit unit 41 executes demodulation processing of a signal received via the main antenna 40, and transmits the processed signal to the control unit 45. The RF circuit unit 41 executes modulation processing of the signal transmitted from the control unit 45, and transmits the signal to external devices (base stations) via the main antenna 40. In addition, on the other hand, the RF circuit unit 41 notifies the control unit 45 of the intensity of a signal received via the main antenna 40.

The display control unit 42 executes predetermined image processing, and outputs the processed image data to the driver IC 23, according to control by the control unit 45. When the image data is transmitted from the display control unit 42, the driver IC 23 stores the image data in frame memory, and outputs the image data on the display unit 21 at predetermined timing.

The sound processing unit 43 executes predetermined sound processing on a signal transmitted from the RF circuit unit 41, and outputs the processed signal to the receiver 22 or a speaker (not shown), according to control by the control unit 45. The receiver 22 or the speaker outputs the signal, which is transmitted from the sound processing unit 43, to the outside.

Furthermore, when a signal is input from the microphone 12, the sound processing unit 43 processes the signal, and outputs the processed signal to the RF circuit unit 41, according to control by the control unit 45. The RF circuit unit 41 executes predetermined processing on the signal transmitted from the sound processing unit 43, and outputs the processed signal to the main antenna 40.

The memory 44 includes, for example, working memory, and is utilized for arithmetic processing by the control unit 45. Moreover, the memory 44 stores a plurality of applications as well as a variety of tables and the like, required by the applications. In addition, the memory 44 may also serve as detachable external memory.

The control unit 45 controls the entirety of the cellular telephone device 1, and is configured to employ a central processing unit (CPU) and the like. Here, a description is provided for control operations of the control unit 45 depending on key operations via the operation unit 11. The control unit 45 changes the characters and functions to be assigned to each key (the function setting operation keys 13, the input operation keys 14 and the selection key 15) configuring the operation unit 11, essentially in accordance with an application that is currently activated.

Figures 3A, 3B, 3C, 3D:
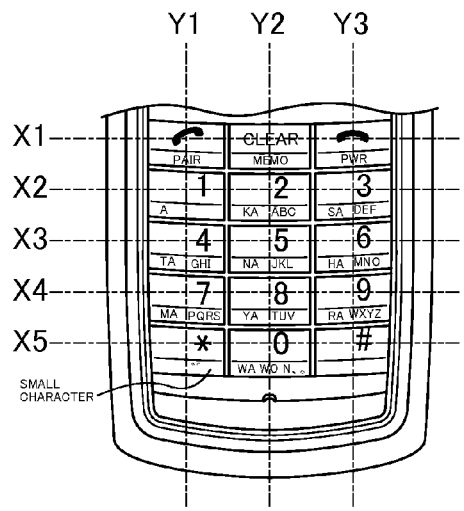
FIG. 3 is a diagram illustrating key assignment.

More specifically, when any key is depressed, the operation unit 11 transmits position information of the key to the control unit 45 (for example, as shown in FIG. 3(a), in a case of depressing a key in the second line and the left row among the input operation keys 14 (a key with "1" and "a" printed on its surface; position information of (X2, Y1) is transmitted). The control unit 45 accesses the memory 44, refers to a key assignment table corresponding to an application that is currently activated, and executes processing of a character and a function assigned thereto, based on the position information that has been transmitted from the operation unit 11. For example, as shown in FIGS. 3(b) to 3(d), the memory 44 stores a plurality of key assignment tables. It should be noted that FIG. 3(b) is a table that is utilized when an outgoing telephone call is made; FIG. 3(c) is a table that is utilized in a memo pad application and a mail application; and FIG. 3(d) is a table that is utilized when changing a channel in a television tuner application.

It should be noted that execution of processing of a character means that, for example, in a case in which the currently activated application is a memo pad application, "1" or "a (hiragana character)" (or "1" or "A (alphabetic character") is displayed on the display unit 21. Furthermore, execution of processing of a function means that, for example, in a case in which the currently activated application is a television tuner application, the display channel is set to channel 1.

Moreover, the memory 44 stores a plurality of key assignment tables. Depending on the application, the control unit 45 switches a key assignment table to be referred to, refers to a predetermined key assignment table based on position information of a key that has been transmitted from the operation unit 11, and executes predetermined processing.

In this way, the cellular telephone device 1 with such a configuration has a function, in which, in a case in which a key operation is executed in the wallpaper state for communication, a plurality of characters (for example, a numeric character and non-numeric type of character) assigned to the key are displayed, for example, on separate screen areas in parallel, respectively, and in a case in which a predetermined key operation is executed, a screen displaying one of the characters is activated. Moreover, in a case in which a key operation is performed in a wallpaper state for communication, one symbol (for example, a character) among a plurality of symbols assigned to the key may be displayed.

In addition, the cellular telephone device 1 has a function to display kanji character conversion candidates as conversion candidates, or subsequent predictive conversion candidates, for a character that has been input via the operation unit 11. Furthermore, the cellular telephone device 1 has a function to execute an application in a case in which a name of the application or a character string indicating the processing details related to the application is input by selecting such a kanji character conversion candidate or a predictive conversion candidate.

Here, operations for exhibiting the aforementioned functions are described. As shown in FIG. 4, the control unit 45 of the cellular telephone device 1 includes a character input unit 50, an application execution unit 51, and a setting control unit 52.

In a case in which the user executes a key operation, the character input unit 50 activates an application (application A) for editing characters and numeric characters, and controls the display control unit 42 to display characters assigned to the key or other characters and numeric characters. Moreover, the character input unit 50 extracts, from the memory 44, kanji character conversion candidates or predictive conversion candidates for the character that has been input, and displays the candidates on the display unit 21 via the display control unit 42.

It should be noted that the memory 44 stores a prediction database (not shown) in which kanji character conversion candidates and predictive conversion candidates are stored and managed. Based on the character that has been input, the character input unit 50 searches the prediction database to extract kanji character conversion candidates such as converted kanji characters as well as predictive conversion candidates as characters to follow thereafter.

Furthermore, based on the character that has been input, the character input unit 50 extracts, from the memory 44, candidates as applications included in the cellular telephone device 1, or operations (processing) in an application so as to be displayed among kanji character conversion candidates or predictive conversion candidates. More specifically, for example, in a case in which a hiragana character "ka" is input, the character input unit 50 displays a katakana character string "kamera (camera)" of which initial character is "ka" in its application name. Subsequently, in a case in which the katakana character string "kamera (camera)" is input, or selected as a predictive conversion candidate, processing names such as "activate" and "how to use" are displayed as predictive conversion candidates as the processing details in the camera application.

It should be noted that activities included in the cellular telephone device 1 (such as names of applications, processing names in the applications, and in addition, names of functions for setting states of the cellular telephone device 1) are stored as data in an activity candidate database in the memory 44.

In addition, in a case in which the user selects an application name or a processing name, the application execution unit 51 executes the corresponding application (for example, camera, mail, television tuner, etc.) or a specific operation (processing) of the application.

Moreover, in addition to executing the applications included in the cellular telephone device 1, the character input unit 50 extracts, from the memory 44, names of functions for setting a state of the cellular telephone device 1 (for example, silent mode, radio-wave-off mode, etc.) so as to be displayed as kanji character conversion candidates or predictive conversion candidates. In accordance with such a function name thus selected, the setting control unit 52 executes setting of a state of the cellular telephone device 1.

It should be noted that the memory 44 and the control unit 45 may be configured with a general computer. Such a general computer may include, for example, a central processing unit (CPU) as the control unit 45, and a hard disk (HDD), etc. together with the memory 44. In such a general computer, the control unit 45 controls the cellular telephone device 1 in an integrated manner, and appropriately reads various programs from the memory 44 to execute the programs, thereby implementing various functions according to the present invention, in collaboration with each component described above.

First Embodiment

Next, a description is provide for processing of limiting a predetermined application (function) by using a character that is input via the control unit 45 in a state where a wallpaper screen is displayed.

It should be noted that, in the present specification, the term "character" is defined to include hiragana characters, katakana characters, numeric characters, alphabetic characters, symbols, etc. Moreover, the term "character" is defined to include not only a single character but also a character string. In addition, the wallpaper screen is a screen that is displayed while waiting for an incoming call, and while waiting for activation of an application; and the wallpaper screen is also referred to as an initial screen.

Furthermore, as shown in FIG. 4, the control unit 45 further includes a setting unit 451 and a function limiting unit 452.

The setting unit 451 sets limitation on a plurality of functions (for example, an electronic mail application, a telephone application, a memo pad application, an application that has been arbitrarily set by a user, etc.) that can be utilized by the application A from the wallpaper screen (for example, utilization is allowed in a case in which correct password is input). It should be noted that the setting unit 451 can arbitrarily set limitation on a plurality of functions according to the user.

In a state where the wallpaper screen is displayed on the display unit 21, in a case in which a character assigned to a key operated in the operation unit 11 is input, the function limiting unit 452 displays the character on the display unit 21, and displays information on a plurality of functions that can utilize the character, on the display unit 21. In addition, based on a function selected from among the plurality of functions that can utilize the character displayed on the display unit 21, the function limiting unit 452 determines whether to limit the function.

Figure 5:
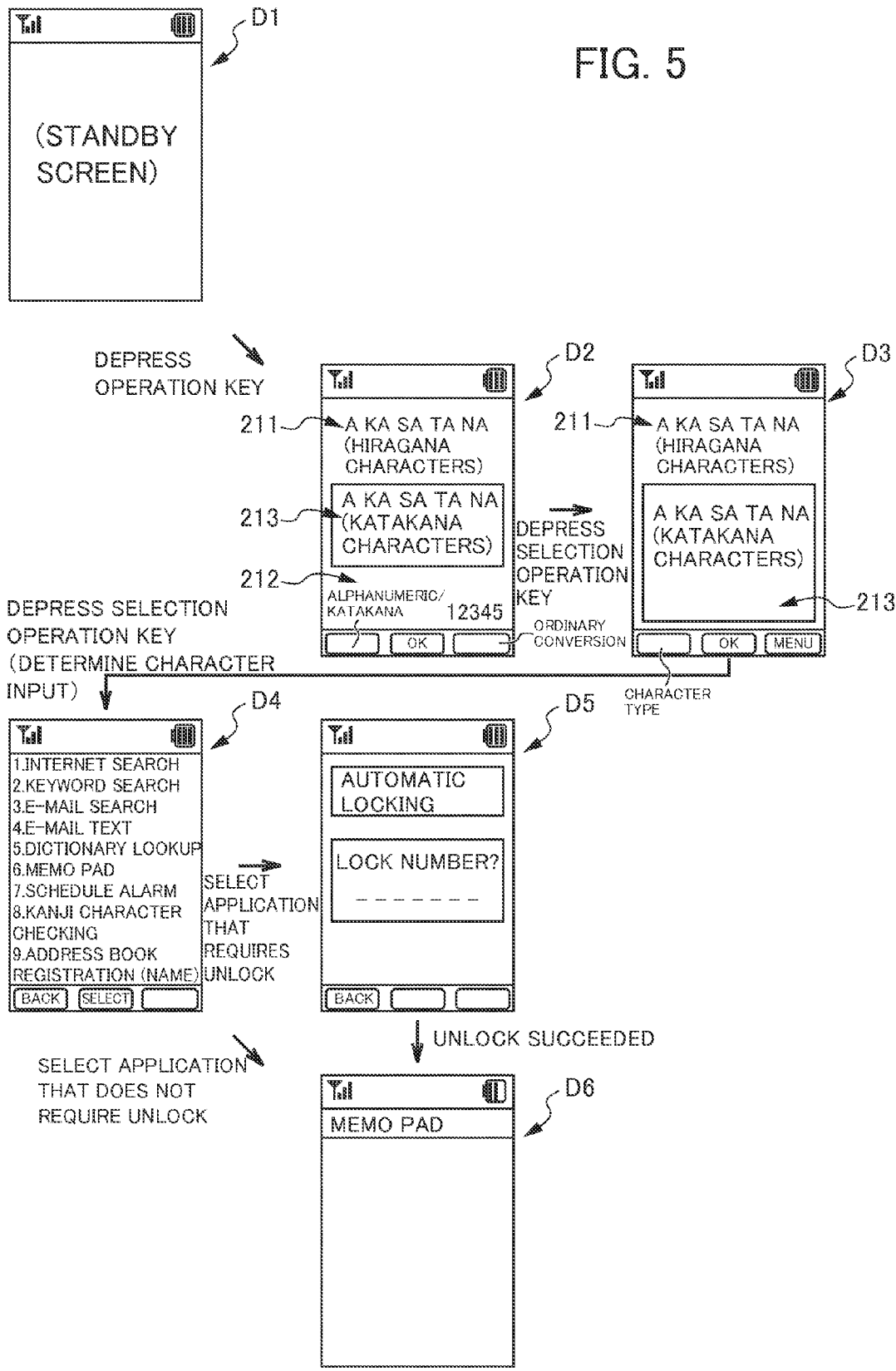
FIG. 5 is a view showing an example of transition of a screen displayed on a display unit according to a first embodiment.

FIG. 5 is a view showing an example of transition of a screen displayed on the display unit 21 according to the first embodiment. In a screen D1 in FIG. 5, the control unit 45 displays a wallpaper screen as an initial screen. In the screen D1, in a case in which the input operation keys 14 (so-called numeric keys) are operated, the function limiting unit 452 activates the application A, and by way of the application A, displays (inputs) hiragana characters "a ka sa ta na", which are assigned to the input operation keys 14 thus operated, in an area 211 of the display unit 21, and displays (inputs) numeric characters "1 2 3 4 5", which are assigned to the input operation keys 14 thus operated, in an area 212 of the display unit 21 (screen D2). Furthermore, the function limiting unit 452 displays conversion candidates "a ka sa ta na (hiragana characters)" and "a ka sa ta na (katakana characters)" for the hiragana characters "a ka sa ta na" that have been input in the area 211, in the area 213 of the display unit 21 (screen D2).

It should be noted that, in a case in which the hiragana characters "a ka sa ta na" are input by operating the input operation keys 14 in a state where the screen D1 is displayed, the function limiting unit 452 may allow only the hiragana characters "a ka sa ta na", which are assigned to the input operation keys 14 thus operated, to be input and displayed in the area 211 of the display unit 21.

In the screen D2, in a case in which the selection operation key 15 is operated (depressed), by way of the application A, the function limiting unit 452 cancels display of the area 212 in which the numeric characters "1 2 3 4 5" were displayed, and displays only the areas 211 and 213 on the display unit 21 (screen D3).

In the screen D3, in a case in which the selection operation key 15 is further operated (depressed), by way of the application A, the function limiting unit 452 determines an input of the characters displayed in the area 211, and displays a list of information on functions (applications) that can utilize the characters, which are displayed in the area 211, on the display unit 21 (screen D4).

In the screen D4, based on contents of a function selected from among the listed functions, the function limiting unit 452 determines whether to limit the function. In addition, in a case of determining that utilization of the selected function is limited, the function limiting unit 452 displays a screen for requesting password on the display unit 21, and limits utilization of the selected function (screen D5). In other words, in a case of determining that utilization of the function is limited, the function limiting unit 452 allows utilization of the function only when the password is input via the operation unit 11.

Subsequently, in a case in which correct password is input via the operation unit 11, the function limiting unit 452 activates the function with limitation being set by the setting unit 451 (screen D6).

On the other hand, in the screen D4, in a case of selecting a function, of which utilization has been determined to be not limited, the function limiting unit 452 activates the selected function without displaying a screen for requesting password (screen D6). In other words, in a case of determining that utilization of the function is not limited, the function limiting unit 452 allows utilization of the function without inputting password via the operation unit 11.

Here, the function, of which utilization has been determined to be limited, preferably includes at least one of a function to use personal information or a function to perform communication with an external device. For example, the function to use personal information or the function to perform communication with an external device may include an address book application, an electronic mail application, a telephone call application, a browser application, etc.

Furthermore, in the cellular telephone device 1 of the first embodiment, the memory 44 stores dictionary data in which conversion candidates for predetermined characters are registered in advance, and in the screen D1, the function limiting unit 452 may use only default dictionary data stored in the memory 44 to display conversion candidates for a character that is input via the operation unit 11, in a predetermined order stored in the default dictionary data, in the area 213 of the display unit 21. Here, the default dictionary data refers to dictionary data that is stored in the memory 44 in advance when shipping the cellular telephone device 1 from the factory, in which no conversion candidates are further added, and the order of displaying conversion candidates is not changed, regardless of the usage status of the user.

Moreover, after the limitation on utilization of the selected function is cancelled to allow utilization thereof, in a case in which the wallpaper screen is displayed on the display unit 21 (the screen D1), the function limiting unit 452 may set limitation on utilization of a plurality of functions (applications) from the wallpaper screen again.

In this way, according to the cellular telephone device 1 of the first embodiment, in a state where the wallpaper screen is displayed on the display unit 21, in a case in which a character assigned to a key operated in the operation unit 11 is input, the function limiting unit 452 displays the character on the display unit 21, and displays information on a plurality of functions that can utilize the character, on the display unit 21. In addition, based on a function selected from among the plurality of functions (applications) that can utilize the character displayed on the display unit 21, the function limiting unit 452 determines whether to limit the function.

As a result, in a state where the wallpaper screen is displayed on the display unit 21, the cellular telephone device 1 determines whether to limit the function depending on the security level of each function; therefore, the operability in the wallpaper screen can be improved while maintaining the security function.

Furthermore, in a case of determining that utilization of the function is limited, the function limiting unit 452 allows utilization of the function only when the password is input via the operation unit 11, and in a case of determining that utilization of the function is not limited, the function limiting unit 452 allows utilization of the function without inputting password via the operation unit 11. As a result, with regard to a function of which utilization is not limited, the cellular telephone device 1 allows utilization of the function without inputting password via the operation unit 11; therefore, the operability from the wallpaper screen can be further improved.

Moreover, the function, of which utilization has been determined to be limited, preferably includes at least one of a function to use personal information or a function to perform communication with an external device. As a result, in the cellular telephone device 1, since the function to use personal information or the function to perform communication with an external device is limited, the security can be maintained.

In addition, the function limiting unit 452 may use only default dictionary data stored in the memory 44 to display conversion candidates for a character that is input via the operation unit 11, in a predetermined order stored in the default dictionary data, in the area 213. As a result, in the cellular telephone device 1, even in a case in which utilization of the function is allowed without inputting password via the operation unit 11, since only default dictionary data stored in the memory 44 is used, other dictionary data and conversion candidates (for example, dictionary data that has been arbitrarily downloaded by a user, conversion candidates that has been set by a user, etc.) will not be utilized. Therefore, even for functions that can be utilized without inputting password, the cellular telephone device 1 can maintain the security of dictionary data.

Furthermore, after the limitation on utilization of the selected function is cancelled to allow utilization thereof, in a case in which the wallpaper screen is displayed on the display unit 21, the function limiting unit 452 may set limitation on utilization of a plurality of functions from the wallpaper screen again. As a result, since the cellular telephone device 1 can automatically set limitation on utilization of a function each time the wallpaper screen is displayed after utilizing the function, the operability of the cellular telephone device 1 can be further improved.

Moreover, in a case in which limitation has been set by the setting unit 451, based on a function selected from among the plurality of functions that can utilize a character displayed on the display unit 21, the function limiting unit 452 determines whether to limit the function. On the other hand, in a case in which limitation has not been set by the setting unit 451, the function limiting unit 452 allows utilization of a function selected from among a plurality of functions that can utilize a character displayed on the display unit 21, without limiting the selected function. As a result, since the cellular telephone device 1 determines whether to limit a function only in a case in which limitation has been set by the setting unit 451, the operability of the cellular telephone device 1 can be further improved.

Figure 6:
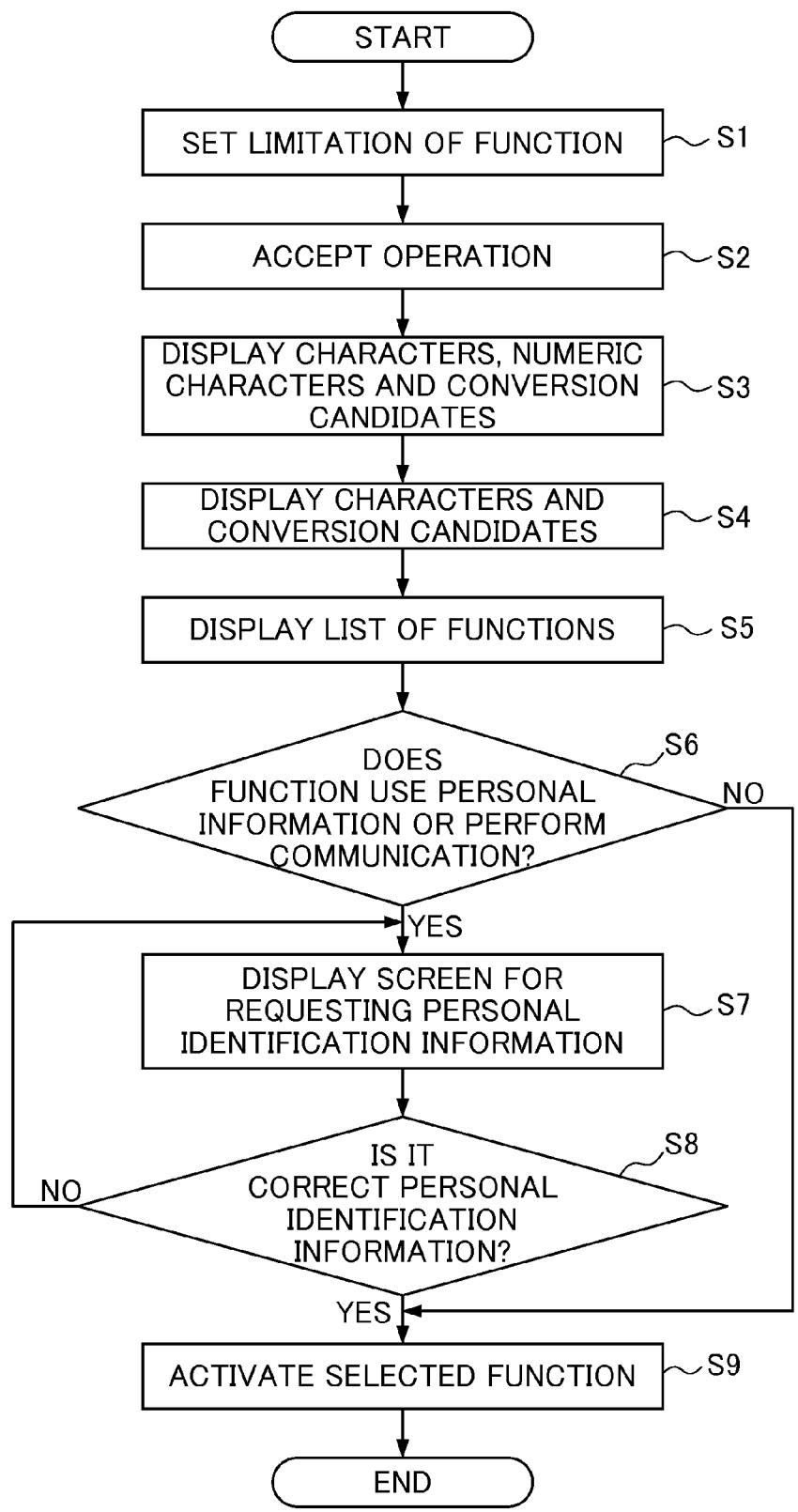
FIG. 6 is a flowchart showing processing of limiting functions by way of the cellular telephone device according to the first embodiment.

FIG. 6 is a flowchart showing processing of limiting functions by way of the cellular telephone device 1 according to the first embodiment. In Step S1, the setting unit 451 sets limitation on a plurality of functions that can be utilized from the wallpaper screen.

In Step S2, in a state where the wallpaper screen is displayed on the display unit 21, the function limiting unit 452 accepts an operation via the operation unit 11.

In Step S3, the function limiting unit 452 activates the aforementioned application for editing characters and numeric characters, displays characters assigned to the input operation keys 14 in the area 211, and displays numeric characters assigned to the input operation keys 14 in the area 213. Furthermore, the function limiting unit 452 displays, in the area 213, conversion candidates for the characters that were input in the area 211.

In Step S4, when the selection operation key 15 is operated, the function limiting unit 452 cancels display of the area 212, and displays only the areas 211 and 213 on the display unit 21. In Step S5, when the selection operation key 15 is further operated, the function limiting unit 452 determines an input of the characters displayed in the area 211, and displays a list of information on functions related to the characters displayed in the area 211.

In Step S6, the function limiting unit 452 determines whether a function selected from the listed functions includes a function to use personal information or a function to perform communication with an external device. In a case in which a function to use personal information or a function to perform communication with an external device is included (YES), the processing advances to Step S7. In a case in which neither a function to use personal information nor a function to perform communication with an external device is included (NO), the processing advances to Step S9.

In Step S7, the function limiting unit 452 displays a screen for requesting password on the display unit 21, and limits utilization of the selected function. In Step S8, the function limiting unit 452 determines whether correct password was input via the operation unit 11. In a case in which correct password was input (YES), the processing advances to Step S9. In a case in which correct password was not input (NO), the processing returns to Step S7.

In Step S9, the function limiting unit 452 activates the selected function. In this way, in the cellular telephone device 1 according to the first embodiment, the operability of the cellular telephone device 1 can be improved while maintaining the security function.

Second Embodiment

Next, a description is provided for a second embodiment according to the portable electronic device of the present invention. The second embodiment is described mainly in terms of differences from the first embodiment, and configurations similar to those in the first embodiment are assigned with the same reference symbols, and descriptions thereof are omitted. The description regarding the first embodiment is applied as appropriate where a description is not particularly provided for the second embodiment.

The cellular telephone device 1 according to the second embodiment is different from that of the first embodiment in that a function is limited in the wallpaper screen.

The setting unit 451 sets limitation on a plurality of functions (for example, an electronic mail application, a telephone application, a memo pad application, an application that has been arbitrarily set by a user, etc.) assigned to the function setting operation keys 13 (for example, utilization is allowed in a case in which correct password is input). It should be noted that the setting unit 451 can arbitrarily set limitation on a plurality of functions according to the user.

In response to an operation via the operation unit 11, the function limiting unit 452 limits utilization of functions with limitation being set by the setting unit 451.

Figure 7:
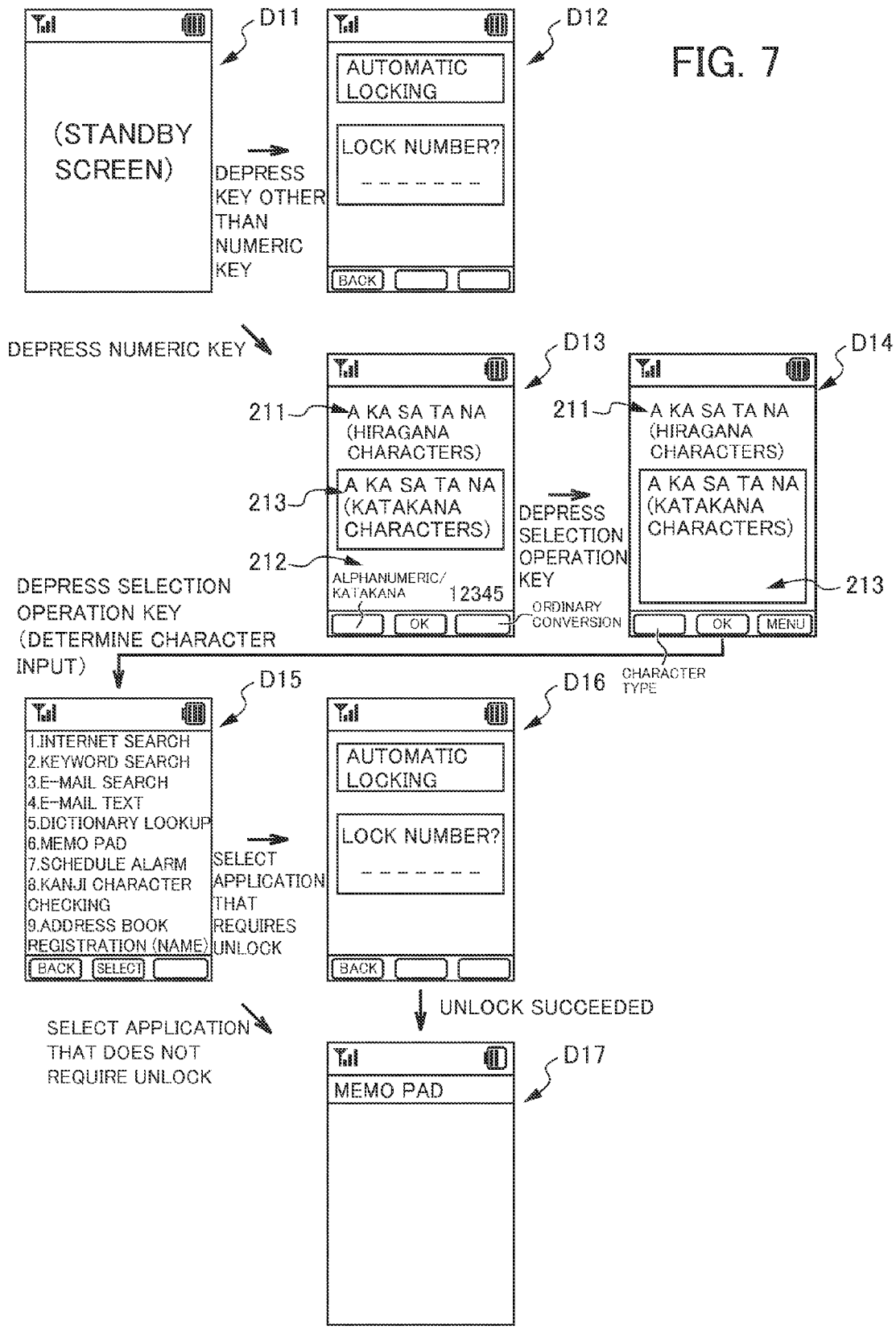
FIG. 7 is a view showing an example of transition of a screen displayed on the display unit according to a second embodiment.
Figure 8:
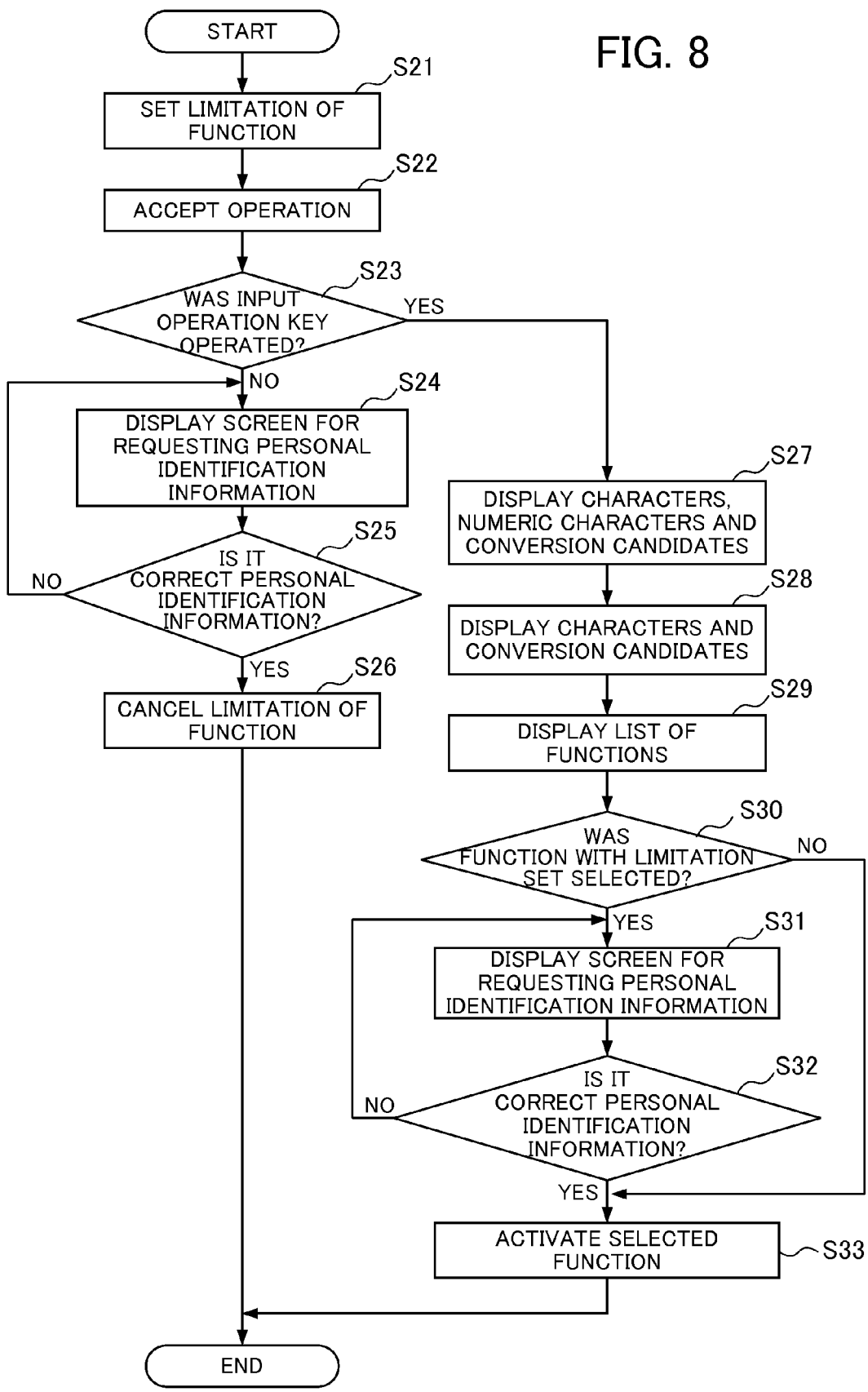
FIG. 8 is a flowchart showing processing of limiting functions by way of the cellular telephone device according to the second embodiment.

FIG. 7 is a view showing an example of transition of a screen displayed on the display unit 21 according to the second embodiment. In a screen D11 in FIG. 7, the control unit 45 displays a wallpaper screen as an initial screen. In the screen D11, in a case in which any one of the function setting operation keys 13 (first key) is operated, the function limiting unit 452 displays a screen for requesting password (for example, a personal identification number, a password, etc.) on the display unit 21, and limits utilization of a function assigned to the one of the function setting operation keys 13 (for example, an electronic mail application, a telephone application, a memo pad application, an application that has been arbitrarily set by a user, etc.) (screen D12).

On the other hand, in the screen D11, in a case in which the input operation keys 14 (so-called numeric keys) (second key) are operated, the function limiting unit 452 activates the aforementioned application (the application A) for editing characters and numeric characters, and by way of the application A, displays (inputs) hiragana characters "a ka sa ta na" that are assigned to the input operation keys 14 thus operated, in the area 211 of the display unit 21, and displays (inputs) numeric characters "1 2 3 4 5" that are assigned to the input operation keys 14 thus operated, in the area 212 of the display unit 21 (screen D13). Furthermore, the function limiting unit 452 displays conversion candidates "a ka sa ta na (hiragana characters)" and "a ka sa ta na (katakana characters)" for the hiragana characters "a ka sa ta na" that have been input in the area 211, in the area 213 of the display unit 21 (screen D13).

It should be noted that, in a case in which the hiragana characters "a ka sa ta na" are input by operating the input operation keys 14 in a state where the screen D11 is displayed, the function limiting unit 452 may allow only the hiragana characters "a ka sa ta na" that are assigned to the input operation keys 14 thus operated, to be input and displayed in the area 211 of the display unit 21.

In other words, in the screen D11 displaying the wallpaper screen, the function limiting unit 452 allows utilization of a function assigned to the setting operation keys 13 only when password is input via the operation unit 11 (for example, via the input operation keys 14) (screen D12). On the other hand, in the screen D11, in a case in which the input operation keys 14 are operated, the function limiting unit 452 inputs and displays characters and numeric characters assigned to the input operation keys 14 on the display unit 21 without inputting password via the operation unit 11 (screen D13).

In the screen D13, in a case in which the selection operation key 15 is operated (depressed), the function limiting unit 452 cancels display of the area 212 in which the numeric characters "1 2 3 4 5" were displayed, and displays only the areas 211 and 213 on the display unit 21 (screen D14).

In the screen D14, in a case in which the selection operation key 15 is further operated (depressed), the function limiting unit 452 determines an input of the characters displayed in the area 211, and displays a list of information on functions (applications) that can utilize the characters that are displayed in the area 211, on the display unit 21 (screen D15).

In the screen D15, in a case of selecting a function with limitation being set by the setting unit 451 (for example, internet search, address book, etc.), the function limiting unit 452 displays a screen for requesting password on the display unit 21, and limits utilization of the function with limitation being set by the setting unit 451 (screen D16). In addition, when correct password is input via the operation unit 11, the function limiting unit 452 activates the function with limitation being set by the setting unit 451 (screen D17).

On the other hand, in the screen D15, in a case in which a function without limitation being set by the setting unit 451 (for example, dictionary lookup, memo pad, etc.) is selected, the function limiting unit 452 activates the function without displaying a screen for requesting password (screen D17).

Moreover, after the limitation on utilization of a function (application) assigned to any one of the function setting operation keys is cancelled to allow utilization thereof, when the wallpaper screen is displayed on the display unit 21 (the screen D11), the setting unit 451 sets limitation on utilization of the function again.

In this way, according to the cellular telephone device 1 of the second embodiment, in a case in which any one of the function setting operation keys 13 is operated, the function limiting unit 452 limits utilization of a function assigned to the one of the function setting operation keys 13, and in a case in which the input operation keys 14 are operated, the function limiting unit 452 inputs and displays characters assigned to the input operation keys 14 on the display unit 21. As a result, in the cellular telephone device 1, in a case in which the security level of a function assigned to any one of the function setting operation keys 13 is high, utilization of the function is limited, thereby making it possible to maintain the security of the cellular telephone device 1. On the other hand, in the cellular telephone device 1, by inputting characters assigned to the input operation keys 14 and displaying the characters on the display unit 21, a function having a low security level can be executed by using the characters thus input. Therefore, in the cellular telephone device 1, the operability of the cellular telephone device 1 can be improved while maintaining the security function.

In addition, in a case in which any one of the setting operation keys 13 is operated, the function limiting unit 452 allows utilization of a function assigned to the one of the setting operation keys 13 only when password is input via the operation unit 11; and in a case in which the input operation keys 14 are operated, the function limiting unit 452 inputs and displays characters assigned to the input operation keys 14 on the display unit 21 without inputting password via the operation unit 11. As a result, in the cellular telephone device 1, since password is not input when executing a function having a low security level, the operability of the cellular telephone device 1 can be further improved.

Furthermore, in a state where the wallpaper screen is displayed on the display unit 21, when any one of the function setting operation keys 13 is operated, the function limiting unit 452 allows utilization of a function assigned to the one of the function setting operation keys 13, and when the input operation keys 14 are operated, the function limiting unit 452 inputs and displays characters assigned to the input operation keys 14 on the display unit 21. As a result, in the cellular telephone device 1, since password is not input when executing a function (application) having a low security level from the wallpaper screen, such a function having a low security level can be quickly activated, and the operability of the cellular telephone device 1 can be further improved.

Moreover, after the limitation on utilization of a function (application) assigned to any one of the function setting operation keys 13 is cancelled to allow utilization thereof, when the wallpaper screen is displayed on the display unit 21, the setting unit 451 sets limitation on utilization of the function again. As a result, after utilizing a function assigned to any one of the function setting operation keys 13, the cellular telephone device 1 can automatically set limitation on utilization of functions each time the wallpaper screen is displayed; therefore, the operability of the cellular telephone device 1 can be further improved.

In addition, in a case in which limitation has been set by the setting unit 451, in a case in which any one of the function setting operation keys 13 is operated, the function limiting unit 452 limits utilization of a function assigned to the one of the function setting operation keys 13, and in a case in which the input operation keys 14 are operated, the function limiting unit 452 inputs and displays characters assigned to the input operation keys 14 on the display unit 21. On the other hand, in a case in which limitation has not been set by the setting unit 451, when any one of the function setting operation keys 13 is operated, the function limiting unit 452 allows utilization of a function assigned to the one of the function setting operation keys 13, and when the input operation keys 14 are operated, the function limiting unit 452 inputs and displays characters assigned to the input operation keys 14 on the display unit 21. As a result, since the cellular telephone device 1 limits utilization of a function only in a case in which limitation has been set by the setting unit 451, the operability of the cellular telephone device 1 can be further improved.

FIG. 6 is a flowchart showing processing of limiting functions by way of the cellular telephone device 1 according to the second embodiment. In Step S21, the setting unit 451 sets limitation on a plurality of functions assigned to the function setting operation keys 13.

In Step S22, in a state where the wallpaper screen is displayed on the display unit 21, the function limiting unit 452 accepts an operation via the operation unit 11. In Step S23, the function limiting unit 452 determines whether the input operation keys 14 were operated. In a case in which the input operation keys 14 were operated (YES), the processing advances to Step S27. In a case in which a key(s) other than the input operation keys 14 was operated, i.e. a case in which a key(s) such as any one of the function setting operation keys 13 or the selection operation key 15 was operated (NO), the processing advances to Step S24.

In Step S24, the function limiting unit 452 displays a screen for requesting password on the display unit 21, and limits utilization of the function assigned to the one of the function setting operation keys 13.

In Step S25, the function limiting unit 452 determines whether correct password was input via the operation unit 11. In a case in which correct password was input (YES), the processing advances to Step S26. In a case in which correct password was not input (NO), the processing returns to Step S24.

In Step S26, the function limiting unit 452 cancels limitation on the function assigned to the one of the function setting operation keys 13, i.e. cancels limitation on an operation (operation lock) of the function setting operation keys 13 in the wallpaper screen, and allows utilization of the function assigned to the one of the function setting operation keys 13.

In Step S27, the function limiting unit 452 activates the aforementioned application (application A) for editing characters and numeric characters, displays characters assigned to the input operation keys 14 in the area 211, and displays numeric characters assigned to the input operation keys 14 in the area 213. Furthermore, the function limiting unit 452 displays, in the area 213, conversion candidates for the characters that were input in the area 211.

In Step S28, when the selection operation key 15 is operated, by way of the application A, the function limiting unit 452 cancels display of the area 212, and displays only the areas 211 and 213 on the display unit 21. In Step S29, when the selection operation key 15 is further operated, by way of the application A, the function limiting unit 452 determines an input of the characters displayed in the area 211, and displays a list of information on functions related to the characters displayed in the area 211.

In Step S30, the function limiting unit 452 determines whether a function with limitation being set by the setting unit 451 was selected from among the listed functions. In a case in which a function with limitation being set was selected (YES), the processing advances to Step S31. In a case in which a function with limitation being set was not selected (NO), the processing advances to Step S33.

In Step S31, the function limiting unit 452 displays a screen for requesting password on the display unit 21, and limits utilization of the function with limitation being set by the setting unit 451. In Step S32, the function limiting unit 452 determines whether correct password was input via the operation unit 11. In a case in which correct password was input (YES), the processing advances to Step S33. In a case in which correct password was not input (NO), the processing returns to Step S31.

In Step S33, the function limiting unit 452 activates the selected function. In this way, similarly to the first embodiment, in the cellular telephone device 1 according to the second embodiment as well, the operability of the cellular telephone device 1 can be improved while maintaining the security function.

Although the embodiments of the present invention have been described above, the present invention is not limited to the aforementioned embodiments, and can be modified as appropriate.

It should be noted that, although the cellular telephone device 1 is described as a portable electronic device in the aforementioned embodiments, the present invention is not limited thereto, and the portable electronic device may be a digital camera, a PHS (Personal Handyphone System), a PDA (Personal Digital Assistant), a portable navigation device, a personal computer, a notebook PC, a mobile gaming device or the like.

What is claimed is:

1. A portable electronic device, comprising:
a display unit;
an operation unit including a plurality of keys to which characters are assigned; and
a control unit,
wherein, in a state where a wallpaper screen is displayed, in accordance with operation of a key, the control unit displays the characters, and displays information on a plurality of functions that can utilize the characters,
wherein, in accordance with selection from among the plurality of functions, the control unit distinguishes whether to limit utilization of a selected function based on whether the selected function includes at least one of a function to use personal information and a function to perform communication with an external device,
wherein, in a case that utilization of the selected function is limited, the control unit displays, using the display unit, a request for a password, and
wherein, the control unit cancels limitation of utilization of the selected function and allows utilization of the selected function in response to entry of the password requested in accordance with operation of the plurality of keys.

2. The portable electronic device according to claim 1, wherein, in a case of distinguishing that utilization of the selected function is not limited, the control unit allows utilization of the selected function without inputting the password.

3. The portable electronic device according to claim 1, further comprising:
a storage unit that stores dictionary data in which conversion candidates for predetermined characters are registered in advance,
wherein the control unit displays conversion candidates for the characters being displayed by using only the dictionary data stored.

4. The portable electronic device according to claim 1, wherein, when the wallpaper screen is displayed after limitation on utilization of the function is cancelled to allow utilization thereof, the control unit limits utilization of the function again.

5. The portable electronic device according to claim 1, further comprising:
a setting unit that sets limitation on utilization of each of the plurality of functions,
wherein, in a case in which limitation has been set by the setting unit, based on the selected function, the control unit distinguishes whether to limit utilization of the function, and
wherein, in a case in which limitation has not been set by the setting unit, the control unit allows utilization of the selected function, without limiting utilization of the selected function.

6. A portable electronic device, comprising:
a display unit;
an operation unit including a first key and second keys, the first key being not assigned with a character and being assigned with a function, the second keys being assigned with characters; and
a control unit, wherein, in a case in which the first key is operated, the control unit limits utilization of a function assigned to the first key based on whether the function includes at least one of a function to use personal information and a function to perform communication with an external device, and in a case in which the second keys are operated, the control unit displays characters assigned to the second keys based on whether the function includes at least one of a function to use personal information and a function to perform communication with an external device,
wherein, in a case that utilization of the function is limited, the control unit displays, using the display unit, a request for a password, and
wherein, the control unit cancels limitation of utilization of the selected function and allows utilization of the function in response to entry of the password requested in accordance with operation of the second keys.

7. The portable electronic device according to claim 6, wherein, in the case in which the second keys are operated, the control unit displays the characters assigned to the second keys without requesting the password.

8. The portable electronic device according to claim 6, wherein, in a state where a wallpaper screen is displayed on the display unit, in a case in which the first key is operated, the control unit allows utilization of a function assigned to the first key, and in a case in which the second keys are operated, the control unit displays characters assigned to the second keys.

9. The portable electronic device according to claim 6, wherein, after limitation on utilization of the function assigned to the first key is cancelled to allow utilization thereof, when a wallpaper screen is displayed on the display unit, the control unit limits utilization of the function again.

10. The portable electronic device according to claim 6, further comprising:
a setting unit that sets limitation on the function,
wherein, in a case in which limitation has been set by the setting unit, in a case in which the first key is operated, the control unit limits utilization of the function assigned to the first key, and in a case in which the second keys are operated, the control unit displays the characters assigned to the second keys, and
wherein, in a case in which limitation has not been set by the setting unit, in a case in which the first key is operated, the control unit allows utilization of the function assigned to the first key, and in a case in which the second keys are operated, the control unit displays the characters assigned to the second keys.

11. A method of controlling a portable electronic device, the method comprising the steps of:
displaying characters on a display unit in accordance with keys operation which are assigned the characters, in a state where a wallpaper screen is displayed;
displaying information on a plurality of functions that can utilize the characters displayed on the display unit;
distinguishing, in accordance with selection from among the plurality of functions, whether to limit utilization of a selected function based on whether the selected function includes at least one of a function to use personal information and a function to perform communication with an external device;
in a case that utilization of the selected function is limited, displaying on the display unit a request for a password; and
cancelling limitation of utilization of the selected function and
allowing utilization of the selected function in response to entry of the password requested in accordance with operation of the keys.

12. A computer-readable device storing instructions that, when executed by a processing device, cause a portable electronic device to perform operations comprising:

displaying characters on a display unit in accordance with keys operation which are assigned the characters, in a state where a wallpaper screen is displayed;

displaying information on a plurality of functions that can utilize the characters displayed on the display unit;

distinguishing, in accordance with selection from among the plurality of functions, whether to limit utilization of a selected function based on whether the selected function includes at least one of a function to use personal information and a function to perform communication with an external device;

in a case that utilization of the selected function is limited, displaying on the display unit a request for a password; and cancelling limitation of utilization of the selected function and allowing utilization of the selected function in response to entry of the requested password in accordance with operation of the keys.

13. A method of controlling a portable electronic device including an operation unit having a first key and second keys, the first key being not assigned with a character and being assigned with a function, the second keys being assigned with characters, the method comprising the steps of:

limiting utilization of a function assigned to the first key in a case in which the first key is operated based on whether the function includes at least one of a function to use personal information and a function to perform communication with an external device;

displaying characters assigned to the second keys in a case in which the second keys are operated;

in a case that utilization of the function is limited, displaying a request for a password; and cancelling limitation of utilization of the selected function and allowing utilization of the function in response to entry of the password requested in accordance with operation of the second keys.

14. A computer-readable device storing instructions that, when executed by a processing device, cause a portable electronic device to perform operations, the portable electronic device including an operation unit having a first key and second keys, the first key being not assigned with a character and being assigned with a function, the second keys being assigned with characters, the operations comprising:

limiting utilization of a function assigned to the first key in a case in which the first key is operated based on whether the function includes at least one of a function to use personal information and a function to perform communication with an external device;

displaying characters assigned to the second keys in a case in which the second keys are operated;

in a case that utilization of the function is limited, displaying a request for a password; and cancelling limitation of utilization of the selected function and allowing utilization of the function in response to entry of the password requested in accordance with operation of the second keys.

* * * * *